Sept. 27, 1932.  J. ROWAN  1,879,516
EYEGLASS MIRROR
Filed Oct. 8, 1930
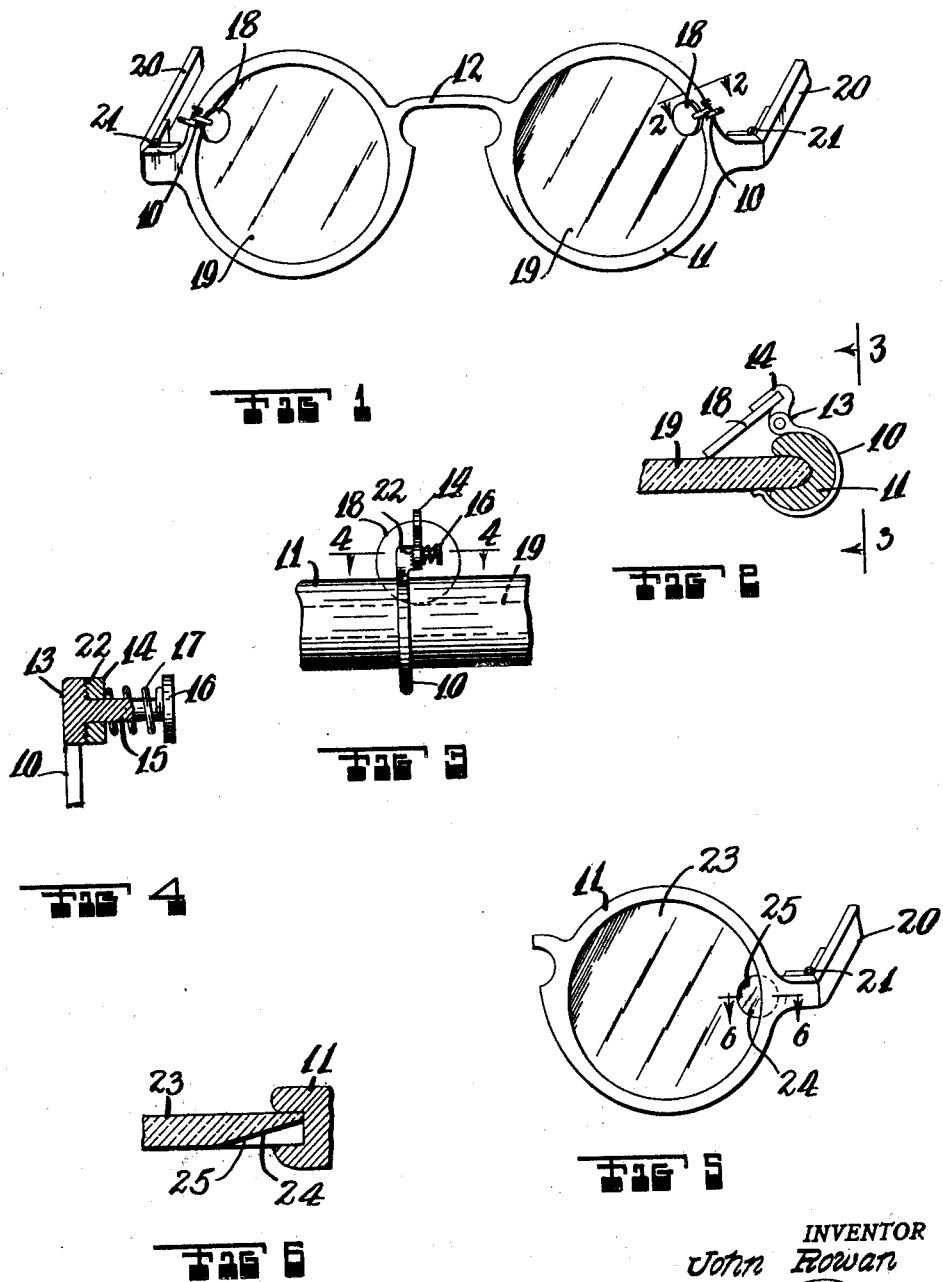
INVENTOR
John Rowan
BY
Zoltan Holachek
ATTORNEY Patented Sept. 27, 1932

1,879,516

UNITED STATES PATENT OFFICE

JOHN ROWAN, OF NEW YORK, N. Y.

EYEGLASS MIRROR

Application filed October 8, 1930. Serial No. 487,104.

This invention relates to new and useful improvements in an eyeglass mirror.

The invention has for an object the provision of an eyeglass mirror arranged to be supported by means adapted for detachable connection upon the frame of glasses.

The invention has for a further object the provision of a resilient clip constituting the means for the detachable mounting.

It is a further object of this invention to provide a means for holding the mirror in various angular adjustments.

This invention also proposes to cut portions of the lenses immediately adjacent the eyeglass frames at proper angles and to silver said cut portions so as to produce mirrors.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary perspective view of a pair of eyeglasses with mirrors constructed according to this invention.

Fig. 2 is a fragmentary enlarged sectional view taken on the line 2—2 of Fig. 1.

Fig. 3 is a fragmentary elevational view looking in the direction of the line 3—3 of Fig. 2.

Fig. 4 is a fragmentary enlarged sectional view taken on the line 4—4 of Fig. 3.

Fig. 5 is a view similar to a portion of 1, but illustrating the modification.

Fig. 6 is a fragmentary sectional view taken on the line 6—6 of Fig. 5.

The eyeglass mirror constructed according to this invention comprises a spring clip 10 for transversely engaging the frame 11 of glasses 12 and formed with an enlarged rear end 13, a mirror support 14 adjacent said enlarged end 13, a stud 15 projecting from said enlarged end 13 and passing through said support 14 to pivotally hold the latter element and having a head 16, a spring 17 on said stud 15 and acting between the head 16 and support 14 to frictionally hold the support against said enlarged end 13 in adjusted positions, and a mirror 18 on said support 14.

The spring clip 10 should preferably be made from spring wire bent substantially into the form of a circle. The frame of the glasses 12 may be of any conventional design and construction. If it is substantially round in cross section, the spring clip 10 should be shaped correspondingly. In Fig. 1 a conventional pair of glasses has been shown, which is provided with lenses 19. If the wearer does not need eyeglasses and still wishes to wear the glasses so as to be capable of looking rearwards through the mirrors, the lenses may be merely flat pieces or glass. The ear bars 20 are shown pivotally connected at 21 upon the frame of the eyeglasses as is customary. The mirror support 14 comprises merely a bent piece of wire clamped so as to support the mirror 18 and formed with a flattened portion positioned adjacent the enlarged end 13.

The stud 15 preferably should be integral with the enlarged end 13, or if this is not practical be welded or brazed to it. The head 16 should be at the free end of the stud 15. The spring 17 is of the helical type, and is shown coaxially arranged upon the stud. One of the ends of the spring acts against the head 16, while the other acts against the support 14 to force the support against the enlarged end 13. The touching faces of these elements are roughened, as indicated by reference numeral 22, to provide friction so as to hold them in various angular adjusted positions.

If it is desired to change the inclination of the mirrors so as to change the range of vision through the mirrors, it is merely necessary to manually move the mirror support 14 slightly laterally upon the stud 15 to press the spring 17 and disengage the roughened surfaces 22. Then pivoting of the support 14 upon the stud may take place until the desired angle is reached. Thereupon, the support 14 should be released and the spring 17 will automatically urge it into engagement with the enlarged end 13 for maintaining the newly adjusted position.

The spring clip may be slipped from the frame of the glasses if this is desired, or may be slid to any new position upon the frame. One mirror may be engaged on the frame, or two, as shown in Fig. 1, according to the tastes of the wearer. In addition to position adjustments of the mirror 18 upon the frame, it is adapted to angular adjustments as before brought out.

In Figs. 5 and 6 a modified form of the device has been illustrated, in which the eyeglass lens 23 is shown with a bevel 24 on its outer side, and silver or similar material 25 is painted or placed upon the bevel so as to provide a mirror which is inclined at an angle so that a wearer of the glasses may look into the mirror and see rearwards. The lens 23 is shown within an eyeglass frame 11 which is provided with ear bars 20 hinged at 21.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, and a mirror on said support.

2. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, and a mirror on said support, said spring clip being formed from spring wire bent substantially in the form of a circle.

3. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, and a mirror on said support, said mirror support being formed from wire bent so as to hold the mirror and having a flattened portion immediately adjacent said enlarged rear end.

4. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, and a mirror on said support, the adjacent surfaces of the mirror support and the enlarged rear end being roughened to provide for frictional engagement.

5. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, and a mirror on said support, said spring being of the helical type and arranged coaxially upon the stud.

6. An eyeglass mirror, comprising a spring clip for transversely engaging on the frame of eyeglasses and formed with an enlarged rear end, a mirror support adjacent said enlarged end, a stud projecting from said enlarged end and passing through said support to pivotally hold the latter element and having a head, a spring on said stud and acting between said head and support to frictionally hold the support against said enlarged end in adjusted positions, a mirror on said support and means to provide friction between the mirror support and the enlarged rear end.

In testimony whereof I have affixed my signature.

JOHN ROWAN.